Feb. 2, 1960
G. I. ROBERTS
2,923,484
COIL FORMING DEVICE
Filed April 1, 1955
2 Sheets-Sheet 1
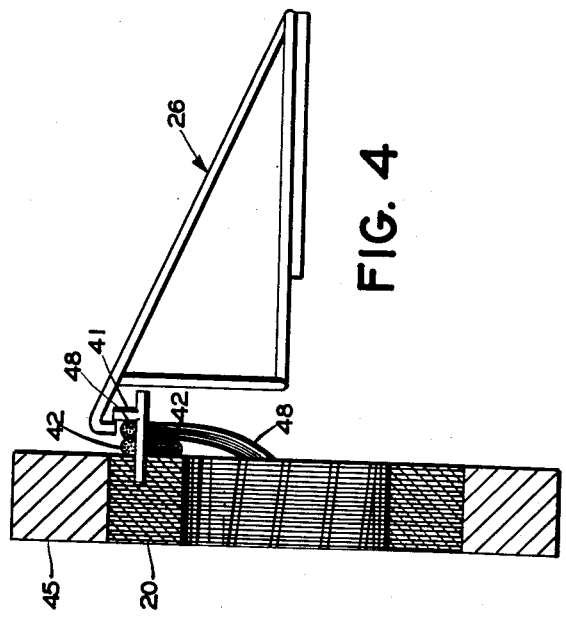
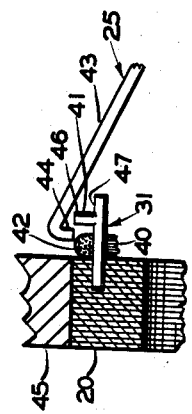
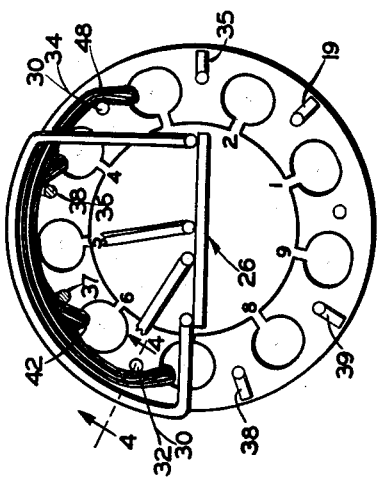
INVENTOR.
GEORGE I. ROBERTS
BY Feb. 2, 1960　　　　G. I. ROBERTS　　　2,923,484
COIL FORMING DEVICE
Filed April 1, 1955　　　　　　　　　　2 Sheets-Sheet 2
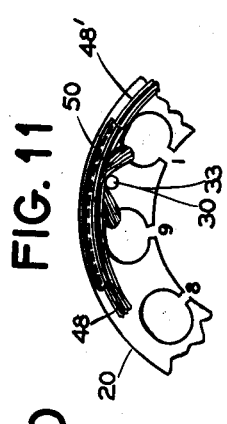
FIG. 7
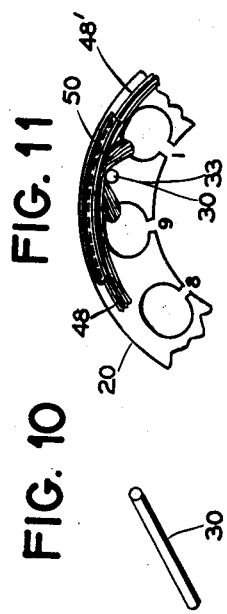
FIG. 6
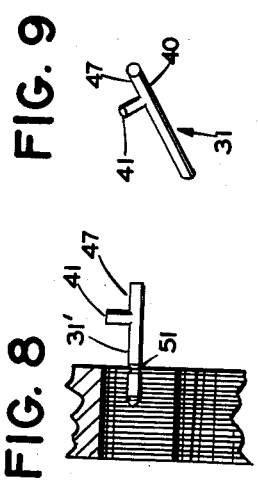
FIG. 11
FIG. 10
FIG. 9
FIG. 8
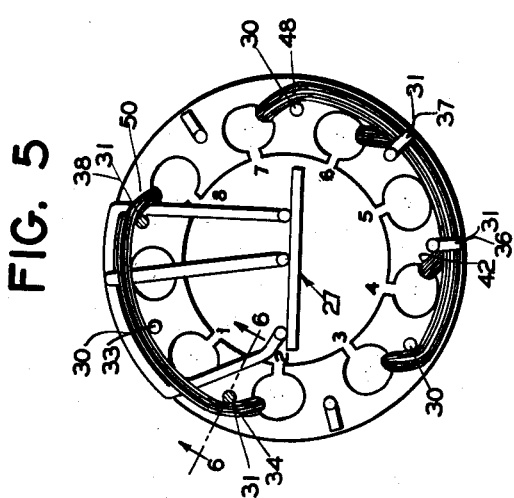
FIG. 5
INVENTOR.
GEORGE I. ROBERTS
BY
*Herbert Smith*

United States Patent Office 2,923,484
Patented Feb. 2, 1960

2,923,484

COIL FORMING DEVICE

George I. Roberts, Maywood, N.J., assignor to Bendix Aviation Corporation, Teterboro, N.J., a corporation of Delaware Application April 1, 1955, Serial No. 498,714

2 Claims. (Cl. 242—1.1)

This invention relates to the art of coil winding and more particularly to the means for forming and holding end turns of coils on pin means secured to the face or end of a stator stack.

The present invention may be used, for example, in conjunction with a coil winding machine of the general type described in my co-pending application Ser. No. 425,527 for Stator Coil Winding Device, and is of the general nature of the invention set forth in my co-pending application, Ser. No. 433,775 now U.S. Patent No. 2,810,848, granted October 22, 1957, for Method and Means of Stator Coil Forming. The aforesaid co-pending applications refer to the stator windings of inductive coupling devices and particularly of displaceable inductive devices wherein the stator windings are distributed, such displaceable inductive coupling devices being disclosed in detail in U.S. Patent 2,488,771, granted to J. P. Glass, Jr. on November 22, 1949, and assigned to the same assignee as the present application.

In the aforementioned patent applications, the stator to be wound is removably affixed within a stator nest which is stationarily positioned in the winding machine. The stator nest is used for supporting and positioning means, including hooks, which support the end turns or loops of coils wound in the slots of a stator, and which stator may be rotated for suitable indexing to position the stator for the particular coil, of a series of coils to be wound according to a desired sequence or predetermined program of coil winding.

The present invention differs generally from the end forming means of the U.S. Patent No. 2,810,848 in that in the present invention the means for forming the end turns of the coils are special-purpose pins having different contact surface contours which are independently secured to the opposing end faces of the stator in predetermined positions normal to the plane of said stator end faces; whereas in said U.S. Patent No. 2,810,848, the end forming means employed a unitary pre-formed insulator having lugs made of the same insulating material and wherein said pre-formed insulator is entirely within the confines of the stator end faces.

The present invention, while it may be used in conjunction with a coil winding device of the general type mentioned above, may or may not employ a stator nest in the form indicated due to the inherent characteristics of the instant novel invention and the method employed. Consequently, the present invention may be used in conjunction with a coil winding machine that does not employ a stator nest, since the stator per se may be stationarily held during the winding operation by a belt, strap, or other means.

An object of the present invention is to provide a novel means to facilitate the production of coil winding.

Another object of the present invention is to provide a novel means to facilitate the production of coil winding by utilizing a multiplicity of independent pin means secured directly to the end faces of a stator nest.

A further object of the invention is to provide a novel means for forming the end turns for a coil of a stator by using a multiplicity of pin means secured to the end faces of a stator with said pin means being disposed at predetermined position relative to the stator slots, and wherein certain of said pin means are dissimilar in shape to certain other of said pin means.

A further object is to provide novel means for form winding the coils of a stator by employing independent pin means secured to the stator nest in predetermined position relative to the stator slots for use in conjunction with a stator coil form winding machine employing a plurality of different form guides, and wherein the particular pins employed have different wire contact surface contours and are associated with certain form guides for the particular coils to be wound and depending on the pattern or end turn configuration.

The present invention contemplates a novel means for forming the end turns of coils as they are being wound in the skewed or straight slots of a stator by an automatic winding machine.

A multiplicity of pins, certain of which have different contact surface contours, are secured normal to each end face of a stator. Certain of said pins have a main body portion which are secured to the stator stack in a position normal thereto with said pins having projections thereon to end-form and maintain the end turns of wire so formed in a pre-determined position relative to said projections during the forming operation of the winding process. Certain other of said pins have no projection thereon with these latter pins being used where there is an overlapping or cross-over of two stator coils. The pins are positioned for press fitting in holes relative to the slots in the stator stack, with certain of said pins being used in conjunction with a particular type of guide means and depending on the end turn pattern or configuration.

The foregoing and other objects and advantages of the invention will appear more fully hereinafter from a consideration of the detailed description which follows, taken together with the accompanying drawings wherein one embodiment of the invention is illustrated by way of example. It is to be expressly understood, however, that the drawings are for illustration purposes only and not to be construed as defining the limits of the invention.

In the drawings:

Fig. 1 is an end view of a stator having pins thereon to receive the end turns of a stator coil and with a portion of the wire guide means partially broken away, relative to the stator.

Fig. 2 is a partial cross sectional view approximately across line 2—2 of Fig. 1.

Fig. 3 is a view somewhat similar to Fig. 1 but for a coil having dimensions different from those shown in Fig. 1.

Fig. 4 is a view taken substantially along lines 4—4 of Fig. 3.

Fig. 5 is a view substantially similar to Fig. 1 but for forming a coil having different dimensions than those shown in Fig. 1.

Fig. 6 is a sectional view taken along the line 6—6 of Fig. 5.

Fig. 7 is a cross sectional view of Fig. 11 showing a pin different from that shown in Fig. 2, wherein there is an overlapping of two different coils with a third coil also on said pin.

Fig. 8 is a sectional view of the stator showing a pin having a scored or reduced portion.

Figs. 9 and 10 are perspective views of two forms of end turn forming pins.

Fig. 11 is a partial end view of the stator with an overlapping cross-over of coils.

Referring to the drawings, and more particularly to

Fig. 1, there is shown a stator 20 having a large central bore 21, a multiplicity of stator slots, such as 22, each having an opening 23 which communicates with the large central bore 21. The stator shown in the present invention has nine stator slots and they are numbered from 1 to 9 in a counter-clockwise direction. For convenience the numerals are not shown on the stator per se, but in practice each stator slot is normally numbered.

In the aforementioned patent application of Roberts, Ser. No. 425,527, there is described a coil winding machine which employs an endless chain as a means for feeding one end of the wire to the central bore of the stator, so that the wire may be positioned in the stator slot by employing end turn form guide means. As the wire is fed through the central bore of the stator, loops will be formed over the form guide means and deposited on hooks carried by a stator support, said hooks being used to form the end turns of the wire of the coil being wound. Form guide means of different characteristics may be readily interchanged for different pitch coils to expedite production, particularly when used for distributing windings in a stator. The purpose of the end turn form guide means is to guide the wire into the stator slots and onto the end turn forming means carried by the stator support or stator nest.

In the present invention the end turn form guide means, such as 25, 26, 27, shown in Figs. 1, 3, and 5, respectively, are to be used for coils having different characteristics. In Fig. 1 the end turn form guide means 25 is for a 12-turn coil, while the end turn form guide means 26 and 27, shown in Figs. 3 and 5, respectively, are for 52- and 34-turn coils.

While the number of turns has no particular bearing on the particular configuration or end turn form guide means, it is presented herein to show a specific example of the coils which may be wound on one stator employing the present invention. The end turn forming means shown in Figs. 1, 3, and 5 are the pins, such as 30 and 31, pin 30 being of a configuration like that shown in Fig. 10, while pin 31 has a configuration like that shown in Fig. 9. In Figs 1, 3, and 5 all pins are the same since Figs. 1, 3, and 5 represent one stator being wound using three different end turn form guide means for coils having three different pitches.

Pins 32, 33, and 34 are pins like pin 30 as shown in Fig. 10 which pins are straight pieces of rigid wire, or plastic. as in Fig. 10; while pins 19, 35, 36, 37, 38, and 39 are all similar and are like the pin shown in Fig. 9, wherein said pin 31, which is the designated numeral for all pins of this type, has a body portion 40 and a projection 41 secured to said body portion and disposed at right angles thereto.

Referring to Figs. 1 and 2, it will be seen that the end turn 42, for the 12-turn coils, is in slots 4 and 6 on one end of the stator, which would be a duplicate of the end turn form on the opposite or unseen end of the stator. The pin 31 (Fig. 2) shows a cross section of the coil 42 relative to the finger 43 of the end turn form guide 25. It will be seen that the free end 44 of the finger 43 is intermediate the stator 20 and the stator nest 45, partially shown, and the projection 41, with the lower tip of the free end 41 being below the tip of the end portion 46 of the projection 41. With the arrangement shown in Figs. 1 and 2, it will be clear that as the wire is drawn off the free end of the finger 43 and onto the body portion 40 of the pin 31, and as the successive end turns or convolutions are formed, the complete coil will ultimately be formed as is shown in Fig. 2.

In the arrangement shown in Fig. 2, it will be clear that the end turn 42 will be formed very close to or in contact with the face of the stator 20.

A shoulder 47 is seen to project beyond the projection 41, and in Fig. 2 it is not used. It remains there for future use from a coil to be wound later.

In Fig. 3, which is a second coil that is wound on the stator, it will be seen that the end turn 42, which is shown completed in Fig. 1, is positioned behind the end turn 48 which is a 52-turn coil wound in slots 3 and 7 by using the end turn form guide means 26. There is one pin, such as 30, located on the stator nest between slots 1 and 9, slots 3 and 4, and slots 6 and 7. Consequently, it will be seen that in Fig. 3, pins 34 and 32 are of the form shown in Fig. 10 and are represented as pins 30, which have no projection thereon; while pins 37 and 38, which are the form or type 31, have projections thereon. Pins 32 and 34, it will be noted, are the outer pins in the arrangement of the four pins shown in Fig. 3, and these are used since there is an overlapping or cross-over between the end turn 48 and a similar 52-turn coil which terminates in slots 4 and 9. Pin 32 is used because there is also an overlapping or cross-over between the end turn 48 and another coil which has one side portion in slot 6, while the other side portion of the last mentioned coil will terminate at slot 1. The particular disposition of the slots is not particularly important as concerns this invention and will differ depending on the particular configuration of coils for any given stator to be wound.

In Fig. 4, it will be seen that the coil 42 is in the same position as shown in Fig. 2, and that the completed end turn 48 or coil is closer to the projection 41 because the end turn form guide means 26 is of a configuration different from that shown in Fig. 1, and is designed for the 52-turn coil having the particular pitch shown in Fig. 3.

In Fig. 5, it will be seen that the stator has been rotated and the end turn form guide means 27 is used to wind a 34-turn coil represented by end turn 50.

The coil having end turn 50 is wound in slots 2 and 8. With the positioning of the end turn 50 shown in Fig. 5, it will be seen that pins 36 and 39 are of the type 31; while pin 33 is of the type 30.

In Figs. 5 and 6, the end turn 50 is shown wound on the shoulder 47 of the pin 31 with the space between the projection 41 and the respective face of the stator 20 having no coil shown positioned therein. The representation presented in Figs. 5 and 6 is to show how a coil is wound on the shoulder 47 of the pin. In normal operation, two coils would previously have been wound on the pin and positioned between the projection 41 and the face of the stator 20, as shown in Fig. 4; but the coils are not reproduced in Figs. 5 and 6 for the sake of clarity in the drawings.

Fig. 7 shows the type 30 pin secured to the stator 20 and with two different 52-turn coils positioned thereon because the end turns of the respective coils overlap. A 34-turn coil is also shown thereon represented by end turn 50. The two 52-turn coils shown in Fig. 7 are represented by an end turn 48 and a similar end turn 48'.

In Fig. 8 a pin 31' is similar to pin 31 except that there is a scored portion 51 which reduces the diameter of the pin in the area of the scored portion, so that the pin is weakened so that it may be broken off after the coils are wedged in the slots.

While pins of the type shown in Figs. 9 and 10 are preferably made of metal, such as steel or brass, the pins may also be made practical to facilitate breaking off if this is desired. However, when metal pins are used they are normally pressed into holes drilled in the proper position on opposed faces of the stator. The metal pins may be broken off at a scored portion, if it is so desired, or they may be removed after the stator coils are wedged in their slots, and the pins may be re-used for end turn forming of coils on other stators. However, if the pins are made of non-metallic material, such as plastic, they may be left in the stator, if desired.

Fig. 11 shows a pin of the type designated by numeral 30, as shown in Fig. 10. The two 52-turn coils, such as 48 and 48', and a 34-turn coil, such as 50, are positioned on one pin in a cross-over or overlap configuration of the end turns required to obtain desired electrical characteristics for the particular stator when employed in a complete electrical unit utilizing the stator.

Fig. 7 shows how the three coils of Fig. 11 are closely arranged next to the stator face by the automatic form winding.

Although but a single embodiment of the invention has been illustrated and described in detail, it is to be expressly understood that the invention is not limited thereto. Various changes may also be made in the design and arrangement of the invention as the same will now be understood by those skilled in the art.

What is claimed is:

1. The combination comprising a core member having a central bore and a plurality of slots formed therein and extending axially therethrough, each of said slots communicating with the central bore, a plurality of pins, each of the pins being disposed in an end face of the core member and positioned intermediate open ends of the slots, said pins being arranged in spaced relation one to another around the end face of the core member, means to guide wire into the slots of the core member and onto the pins at the end face of the core member, said pins receiving end turns of said wire during a coil winding operation, said pins having elongated body portions, a group of said pins including projections on the elongated body portions thereof positioned intermediate the ends of the pins of said group, the projections being of a predetermined length and extending substantially parallel to the end face of said core member, parts of the body portions of the pins of said group being located at inner sides of the projections and other parts of the body portions of the pins of said group being located at outer sides of the projections, said guide means including a plurality of guide members cooperating with said pins and the pins of said group during the winding operation, one of said guide members cooperating with the pins of said group so as to place wire of a coil winding on the parts of the body portions thereof between the end face of the core member and the inner sides of the projections thereon, and another of said guide members cooperating with the pins of said group so as to place wire of another coil winding on the other parts of the body portions thereof at the outer sides of said projections so as to apply a plurality of coil windings to said core member.

2. The combination comprising a core member having a central bore and a plurality of slots formed therein and extending axially therethrough, each of said slots communicating with the central bore, a plurality of pins, each of the pins being disposed in an end face of the core member and positioned intermediate open ends of the slots, said pins being arranged in spaced relation one to another around the end face of the core member, means to guide wire into the slots of the core member and onto the pins at the end face of the core member, said pins receiving end turns of said wire during a coil winding operation, said pins having elongated body portions, a group of said pins including projections on the elongated body portions thereof positioned intermediate the ends of the pins of said group, the projections being of a predetermined length and extending substantially parallel to the end face of said core member, parts of the body portions of the pins of said group being located at inner sides of the projections and other parts of the body portions of the pins of said group being located at outer sides of the projections, said guide means including a plurality of guide members cooperating with said pins and the pins of said group during the winding operation, one of said guide members cooperating with the pins of said group so as to place wire of a coil winding on the parts of the body portions thereof between the end face of the core member and the inner sides of the projections thereon, another of said guide members cooperating with the pins of said group so as to place wire of another coil winding on the other parts of the body portions thereof at the outer sides of said projections so as to apply a plurality of coil windings to said core member, and the body portions of said pins being notched to facilitate removal of the pins from the end face of the core member and from the coil windings upon completion of the winding of the coils.

References Cited in the file of this patent

UNITED STATES PATENTS

| 213,252 | Sargent | Mar. 11, 1879 |
| 268,613 | Brinkerhoff | Dec. 5, 1882 |
| 372,595 | Brecht | Nov. 1, 1887 |
| 819,971 | Beck | May 8, 1906 |
| 1,024,371 | Soley | Apr. 23, 1912 |
| 1,612,026 | Jannell | Dec. 28, 1926 |
| 1,977,828 | Laib et al. | Oct. 23, 1934 |
| 2,304,520 | Wirtz et al. | Dec. 8, 1942 |
| 2,624,518 | Scofield et al. | Jan. 6, 1953 |

FOREIGN PATENTS

| 152,366 | Switzerland | Apr. 16, 1932 |
| 673,793 | Great Britain | June 11, 1952 |